United States Patent
Järvinen et al.

(10) Patent No.: US 10,928,256 B2
(45) Date of Patent: *Feb. 23, 2021

(54) CAPACITANCE FORCE AND/OR PRESSURE SENSOR HAVING STRETCHABLE ELECTRODES

(71) Applicant: Forciot Oy, Tampere (FI)

(72) Inventors: Petri Järvinen, Tampere (FI); Mikko Turunen, Akaa (FI); Jarmo Heittokangas, Julkujärvi (FI); Jukka Vanhala, Pirkkala (FI); Pekka Iso-Ketola, Sastamala (FI)

(73) Assignee: Forciot Oy, Tampere (FI)

( * ) Notice: Subject to any disclaimer, the term of this patent is extended or adjusted under 35 U.S.C. 154(b) by 0 days.

This patent is subject to a terminal disclaimer.

(21) Appl. No.: 16/671,204

(22) Filed: Nov. 1, 2019

(65) Prior Publication Data

US 2020/0064211 A1 Feb. 27, 2020

Related U.S. Application Data

(63) Continuation of application No. 16/315,173, filed as application No. PCT/FI2017/050462 on Jun. 20, 2017, now Pat. No. 10,591,367.

(30) Foreign Application Priority Data

Jul. 11, 2016 (FI) .................................... 20165581

(51) Int. Cl.
  *G01L 1/14* (2006.01)
  *G01D 5/241* (2006.01)

(52) U.S. Cl.
  CPC ............ *G01L 1/146* (2013.01); *G01D 5/2417* (2013.01)

(58) Field of Classification Search
  None
  See application file for complete search history.

(56) References Cited

U.S. PATENT DOCUMENTS

| | | | |
|---|---|---|---|
| 9,658,120 B2* | 5/2017 | Otaka | G06F 3/044 |
| 10,184,779 B2* | 1/2019 | Norisada | G01L 1/146 |
| 10,267,690 B2* | 4/2019 | Wu | G01L 1/146 |

(Continued)

*Primary Examiner* — Peter J Macchiarolo
*Assistant Examiner* — Jermaine L Jenkins
(74) *Attorney, Agent, or Firm* — Berggren LLP

(57) ABSTRACT

The invention relates to sensor (900) for use as a pressure and/or a force sensor. The sensor (900) comprises a elastic and stretchable layer (050, 100, 200) with material having a first Young's modulus ($Y_{200}$) and a first yield strain ($\varepsilon_{y,200}$); at least a first stretchable electrode (301) and a second stretchable electrode (302) attached to the elastic and stretchable layer (050, 100, 200) and arranged a first distance ($d_1$, $d_{1,301,302}$) apart from each other; a flexible foil (500) having a second Young's modulus ($Y_{500}$); and electrically conductive wiring (400) attached to the flexible foil (500). At least a part of the electrically conductive wiring (400) is coupled to the stretchable electrodes (301, 302) in an electrically conductive manner; the first yield strain ($\varepsilon_{y,200}$) is at least 10 percent; the first Young's modulus ($Y_{200}$) is less than the second Young's modulus ($Y_{500}$).

20 Claims, 8 Drawing Sheets

(56) References Cited

U.S. PATENT DOCUMENTS

| | | | |
|---|---|---|---|
| 10,317,442 B2* | 6/2019 | Kawaguchi | G01R 27/2605 |
| 10,337,849 B2* | 7/2019 | Otaka | G01B 7/16 |
| 2009/0129031 A1* | 5/2009 | Someya | G01J 5/02 |
| | | | 361/729 |
| 2009/0273483 A1* | 11/2009 | Tompkins | G01L 1/142 |
| | | | 340/657 |
| 2018/0256071 A1* | 9/2018 | Mathieu | A43B 17/00 |

* cited by examiner

CAPACITANCE FORCE AND/OR PRESSURE SENSOR HAVING STRETCHABLE ELECTRODES

This application is a continuation application of the U.S. national application Ser. No. 16/315,173, which is a U.S. national application of PCT-application PCT/FI2017/050462 filed on Jun. 20, 2017 and claiming priority of Finnish application FI20165581 filed on Jul. 11, 2016, the contents of all of which are incorporated herein by reference.

TECHNICAL FIELD

The invention relates to force sensors. The invention relates to pressure sensors. The invention relates to capacitive force and/or pressure sensors. The invention relates to wearable capacitive force and/or pressure sensors.

BACKGROUND

Interest in well-being has increased. This involves personal well-being as well as health care. This has resulted in many personal and medical monitoring devices, such as sensors. Such sensors can be embedded in clothing, such as gloves, mitts, footwear, helmets, etc. As for force or pressure sensors for garments, they may be e.g. piezo resistive, piezoelectric, or capacitive. A capacitive force/pressure sensor typically involves only easily available materials.

In capacitive sensors, the capacitance of an electrode is measured. The capacitance can be measured relative to surroundings or relative to another electrode, such a ground electrode. In general there are two working principles: (1) the dielectric material close to the electrode (e.g. in between two electrodes) changes, which changes the capacitance; and/or (2) the distance between two electrodes changes, which changes the capacitance in between these electrodes. These principles are known to a skilled person.

For example, the patent application DE102009055121 discloses a force sensor having multiple conductors and an elastic non-conductive layer in between. By applying force, the elastic non-conductive layer deforms, which results in a change of capacitance in between the conductors (i.e. electrodes).

In such sensors there are several interrelated problems. For example, the area of the electrodes should be reasonably large in order to measure the force accurately. Moreover, the measurement of the capacitance of an electrode should not affect the measurement result of the capacitance of another electrode. Furthermore, it would be beneficial that multiple capacitances can be measured in parallel, i.e. simultaneously or substantially simultaneously. For example, when monitoring the performance of a high jumper, one should be able to measure the pressure distribution under foot as function of time with reasonable high sampling rate. Moreover, the spatial resolution should be reasonably high, whereby the number of electrodes should be reasonably high. Still further, the sensor should be comfortable to wear and mechanically reliable.

SUMMARY

A force and/or pressure sensor that has a good balance between the aforementioned aspects is disclosed. The force and/or pressure sensor comprises a layer or layers that is/are stretchable and elastic. The sensor further comprises stretchable electrodes attached to this layer or one of these layers. The stretchability improves the comfort of the force sensor. However, it has been realized that wiring of the electrodes poses problems. On a stretchable layer, stretchable wiring would have to be reasonable wide, because of the stretchable materials usable for such purposes. This poses problems, since a wide wiring decreases the size of the electrodes, whereby only a local pressure can be measured instead of a total force. To solve this problem, wiring for the electrodes is arranged on a flexible foil. In contrast to the electrodes, the wiring on the foil need not be stretchable. Thus the wiring can be made significantly narrower, and correspondingly, the electrodes larger. More specifically the invention is disclosed in the independent claim.

Furthermore, when the wiring is arranged to extend mainly in areas in between the electrodes, the measurement of a capacitance does not disturb the measurement of another capacitance. This and other embodiments are disclosed in the dependent claims.

DETAILED DESCRIPTION

The invention relates to a sensor 900 that is suitable for use as a pressure and/or a force sensor. A force or pressure sensor according to embodiments of the invention is relatively thin. That is, the thickness is less than the smaller of length and width. The shape of the sensor may be planar. Moreover, the sensor is conformable, whereby in use, its shape may be different from the shape when stored. E.g. a sensor may be stored in planar form, and when incorporated in e.g. a mitt, the shape may conform to the shape of the mitt. The embodiments are presented in planar form; however it is understood that the sensor can be attached to an arbitrarily curved object.

Figure 1A:
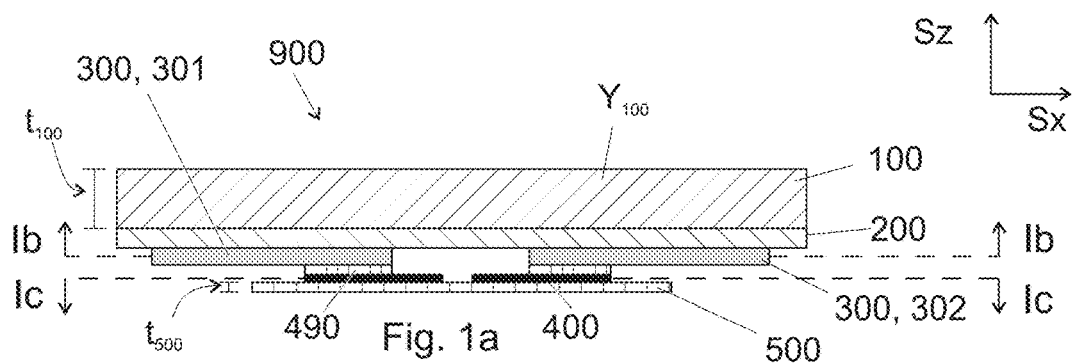
FIG. 1a shows in a side view an embodiment of a force and/or pressure sensor.
Figure 1B:
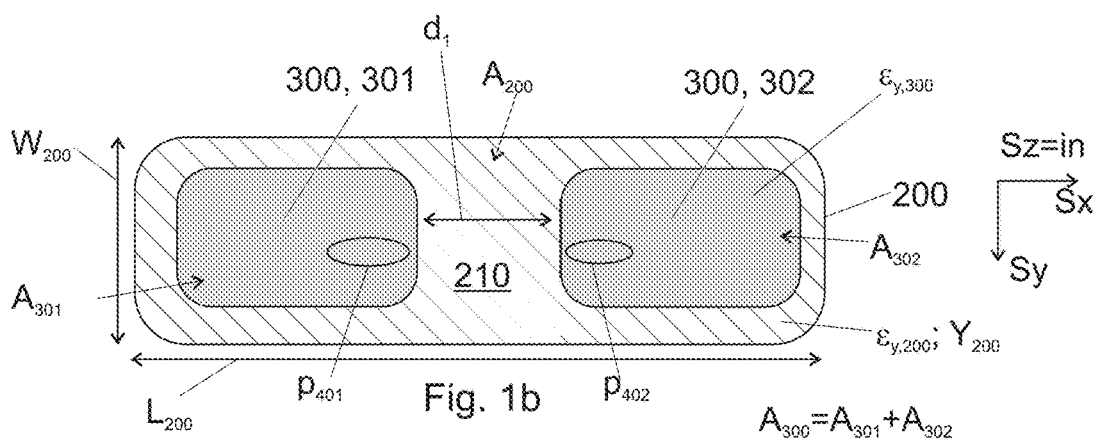
FIG. 1b shows in a bottom view the section Ib-Ib of the force and/or pressure sensor of FIG. 1a, FIG. 1c shows in a top view the section Ic-Ic of the force and/or pressure sensor of FIG. 1a, FIG. 1d shows in a bottom view the layers of the force and/or pressure sensor of FIG. 1a, FIG. 1e shows in a side view an embodiment of a force and/or pressure sensor having the stretchable electrodes attached to an elastic and stretchable layer 050.
Figure 1C:
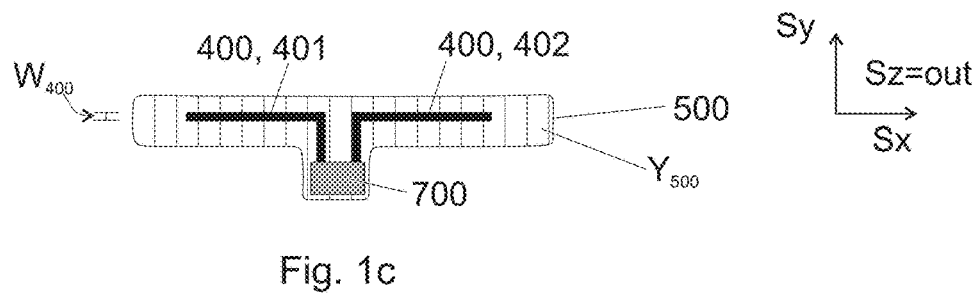
Figure 1D:
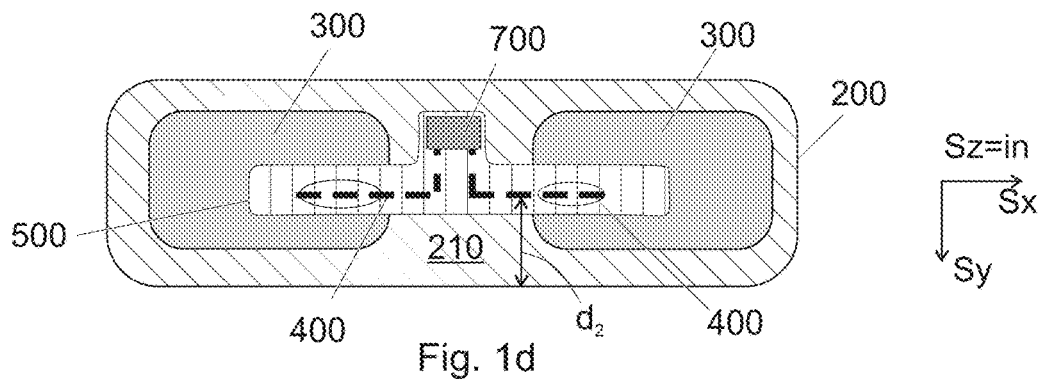
Figure 1E:
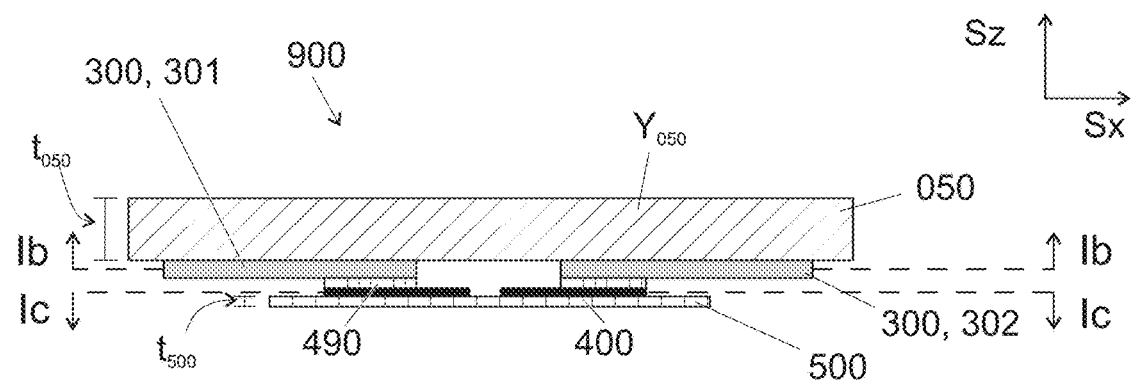

FIGS. 1a and 1e show embodiments of a force and/or pressure sensor 900 in a side view. In the figures, the direction Sz refers to the direction thickness of the force and/or pressure sensor 900. Other directions Sx and Sy are perpendicular to Sz and to each other. Herein below, the force and/or pressure sensor 900 is referred to as a force sensor 900, even of some embodiments of the sensor are suited for measuring a pressure and in this way at least part of a force. This issue will be clarified below.

Referring to FIG. 1e, an embodiment comprises an elastic and stretchable layer 050. Referring to FIG. 1a, the elastic and stretchable layer 050 may comprise an elastic layer 100 and a stretchable layer 200. The stretchable layer 200 is also elastic at least to some extent.

Figure 5A:
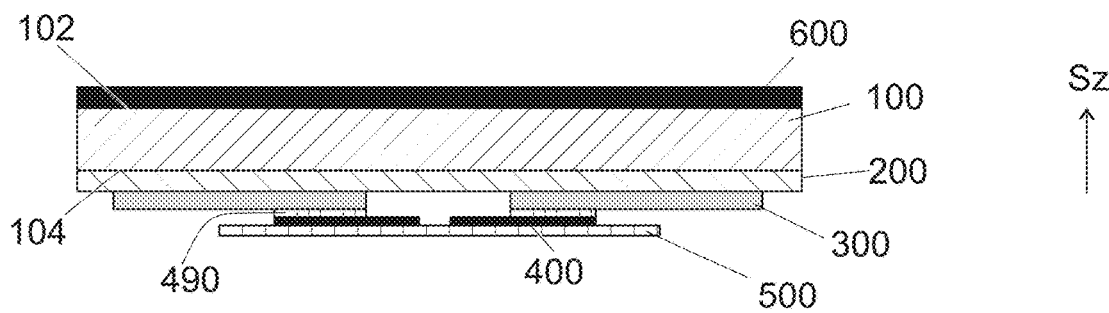
FIG. 5a shows in a side view an embodiment of a force and/or pressure sensor having an electrically conductive layer.
Figure 5B:
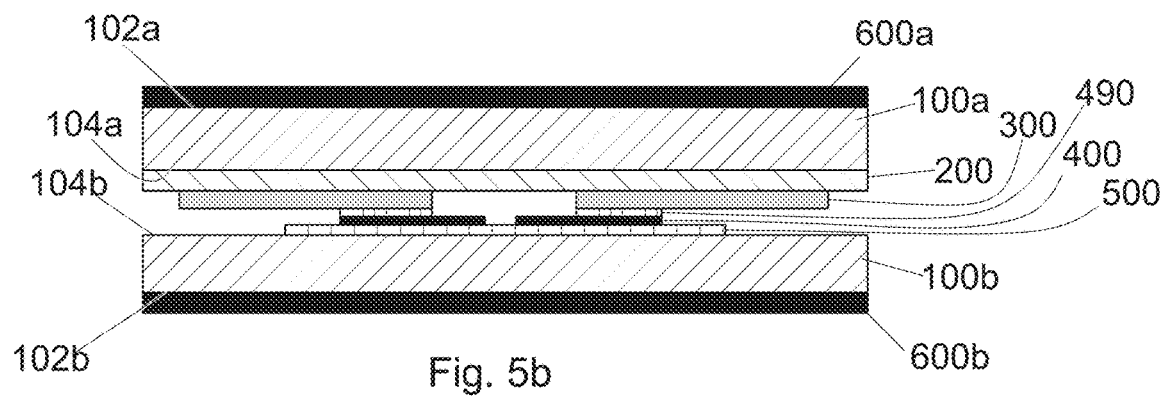
FIG. 5b shows in a side view an embodiment of a force and/or pressure sensor having two electrically conductive layers.

The force sensor 900 of FIG. 1a comprises an elastic deformable layer 100 (or 100a in FIG. 5b). In use, this layer deforms and as a result, the capacitance of an electrode 300 changes. To ensure reasonable deformations in use, the elastic deformable layer 100 (i.e. the material of the elastic deformable layer 100) has a third Young's modulus $Y_{100}$. For example, the material of the layer 100 may be selected such that the layer 100 is compressed, in typical use, about 1 to 15%; such as up to 30%. Naturally, the compression depends on the pressure, which need not be spatially or temporally uniform. Typical pressures may be of the order of 2 kPa to 1000 kPa, e.g. a person standing on a foot or feet, possibly also taking off, may induce such a pressure. Thus, the third Young's modulus $Y_{100}$ may be e.g. at most 15 MPa or at most 5 MPa. In addition, third Young's modulus $Y_{100}$ may be e.g. at least 0.05 MPa or at least 0.2 MPa, A large strain (resulting from a small Young's modulus) could make the material of the elastic deformable layer 100 to creep in use. This could deteriorate measurements in the long term. Moreover, a small strain (resulting from a large Young's modulus) is hard to measure.

The thickness $t_{100}$ of the elastic deformable layer 100 is not critical. A stress imposes a strain (i.e. proportional deformation) to the layer 100, and the strain affects the change of capacitance of the electrodes. In some applications, such as an insole, the thickness of the elastic deformable layer 100 may be e.g. from 1 mm to 5 mm, in order to have a comfortable sensor that fits regular footwear.

In an embodiment, the elastic deformable layer 100 comprises at least one of polyurethane, polyethylene, poly(ethylene-vinyl acetate), polyvinyl chloride, polyborodimethylsiloxane, polystyrene, acrylonitrile-butadiene-styrene, styrene-butadienestyrene, ethylene propylene rubber, neoprene, cork, a ex, natural rubber, silicone, and thermoplastic elastomeric gel.

Some of these materials are commercially sold under the trade names Plastazote®, Evazote®, Zotek®, Poron®, Pe-Lite® (medium), Spenco®, and Sorbothane®.

The force sensor comprises a stretchable layer 200. The layer 200 is stretchable in order for it to adapt, in use, to the shape of the object that comprises the sensor. For example in case a mitt or an insole comprises the sensor, the stretchable layer 200, in use, may stretch to conform with the dynamic shape of the mitt or the insole. In this way, the stretchability improves the comfort of the sensor. However, for reasonably easy stretching, the stretchable layer 200 (i.e. the material of the stretchable layer) has a relatively small first Young's modulus $Y_{200}$. In an embodiment, the first Young's modulus $Y_{200}$ is smaller than the Young's modulus $Y_{500}$ of a flexible foil 500. However, in order to have the deformations within the sensor concentrated mainly in the elastic deformable layer 100, in an embodiment, the third Young's modulus $Y_{100}$ is smaller than the first Young's modulus $Y_{200}$. This improves the measurement accuracy, as the locations of the compressions are better controlled.

As for the stretchability, the stretchable layer 200 (i.e. the material of the stretchable layer 200) has a reasonably large first yield strain $\varepsilon_{y,200}$. In an embodiment, the first yield strain $\varepsilon_{y,200}$ is at least 10 percent. This value has been found to be sufficiently high for a comfortable force sensor in many applications. This value has been found to be sufficiently high also from the point of view of mechanical reliability of the stretchable layer 200, since typical deformations are less than this value. In the alternative, the first yield strain $\varepsilon_{y,200}$ may be at least 20 percent or at least 30 percent. In addition, the stretchable layer 200 (i.e. the material of the stretchable layer) is electrically insulating. Throughout this description, an electrically insulating material refers to a material of which resistivity (i.e. specific electrical resistance) is more than 100 Ωm at the temperature 20° C.

The stretchable layer 200 may be made of suitable polymer film. The stretchable layer 200 may be made of suitable fabric. In an embodiment; the stretchable layer 200 comprises a polymer film, such as a film of thermoplastic polyurethane (TPU). The TPU may comprise polyester-based TPU and/or polyether-based TPU. In an embodiment, the stretchable layer comprises fabric, e.g. polyamide (such as nylon) or polyester. The stretchable layer 200 may comprise fabric and a film.

The force sensor comprises at least a first stretchable electrode 301 and a second stretchable electrode 302 attached to the stretchable layer 200; or to the elastic and stretchable layer 050. The individual stretchable electrodes are referred to by the references 301, 302, 303, . . . ; while the stretchable electrodes in general are referred to by the reference 300. The stretchable electrodes 300 are made of an electrically conductive material. Throughout this description, an electrically conductive material refers to a material of which resistivity (i.e. specific electrical resistance) is less than 1 Ωm at the temperature 20° C. In order to electrically insulate the stretchable electrodes 300 from each other, the first stretchable electrode 301 is arranged a distance $d_1$ apart from the second stretchable electrode 302 (see FIG. 1b). As for the stretchability of the stretchable electrodes 300, the stretchable electrodes 300 have a second yield strain $\varepsilon_{y,300}$ that is, in an embodiment, at least 10 percent. This value has been found to be sufficiently high for a conformable force sensor in many applications. A conformable sensor is comfortable to wear and mechanically reliable under variable load. This value has been found to be sufficiently high also from the point of view of mechanical reliability of the stretchable electrodes 300, since typical deformations are less than this value. In the alternative, the second yield strain $\varepsilon_{y,300}$ may be at least 20 percent or at least 30 percent. Typically, the second yield strain $\varepsilon_{y,300}$ is less than the first yield strain $\varepsilon_{y,200}$. As is conventional, a distance $d_1$ between first and second electrodes and a distance $d_{1,i,j}$ between electrodes i and j refer to the distance between closest points of the two electrodes, i.e. the smallest distance in between the two electrodes.

In an embodiment, a stretchable electrode (301, 302) or all the stretchable electrodes 300 is/are made from conductive ink. In an embodiment, a stretchable electrode (301, 302) or all the stretchable electrodes is/are made from electrically conductive fabric or fibres. In an embodiment, the stretchable layer 200 comprises TPU and the stretchable electrodes 300 are made from conductive ink. In an embodiment, the stretchable layer 200 comprises non-conductive fabric in between the stretchable electrodes 300, and the stretchable electrodes 300 or at least some thereof may have been made using conductive fabric, such as polyamide or polyester that is coated by a metal, such as silver. In the alternative or in addition, conductive ink may be used in combination with fabrics to form the stretchable electrodes 300 or at least some thereof.

Conductive inks and fabrics typically comprise electrically conductive particles, such as flakes or nanoparticles, attached to each other. Thus, in an embodiment, the first stretchable electrode 301 comprises electrically conductive particles, such as flakes or nanoparticles, attached to each other in an electrically conductive manner. In a preferable embodiment, the electrically conductive particles comprise at least one of carbon, copper, silver, and gold.

Figure 4A:
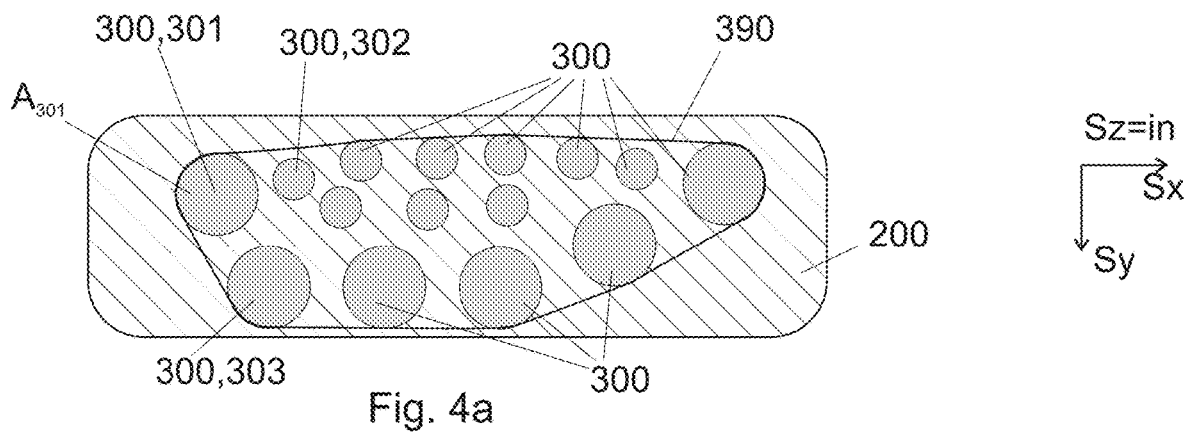
FIG. 4b shows in a bottom view a stretchable layer and stretchable textile electrodes arranged thereon.
FIG. 4c shows in a bottom view layers of a force and/or pressure sensor having the stretchable layer and the stretchable textile electrodes of FIG. 4b.

Referring to FIG. 4a, the first stretchable electrode 301 may be made from conductive ink, whereby the first stretchable electrode 301 is reasonably homogeneous. Such a stretchable electrode is configured to detect the changes of capacitance in an area substantially the same as the area of the electrode. Thus, the effective area $A_{301}$ (see FIGS. 1b and 4a) from which such a stretchable electrode is configured to measure pressure, is equal to the area of the stretchable electrode 301 itself. Herein the area refers to the area of the cross section of the stretchable electrode onto a plane having a surface normal that is parallel to the direction of thickness of the sensor 900.

Figure 4B:
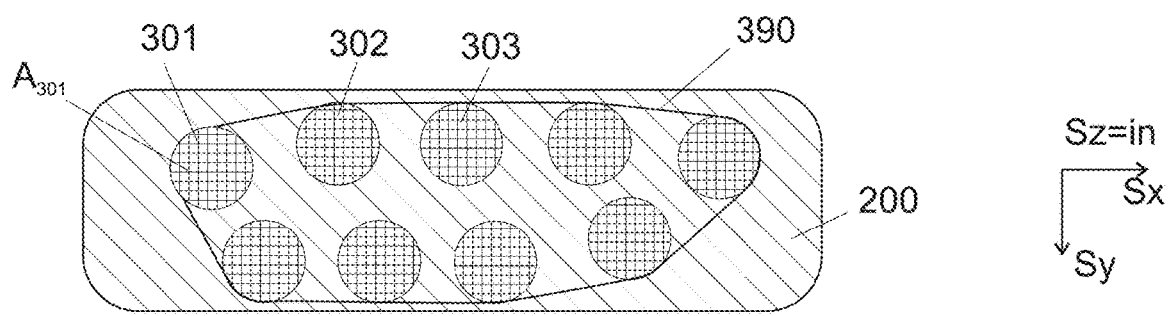

However, referring to FIG. 4b, the first stretchable electrode 301 may be e.g. sewed to on otherwise non-conductive layer 200, e.g. textile layer. Thus, the stretchable electrode 301 may be made as a mesh of conductive yarns, such as metal-coated polyamide or polyester. It is noted that also such a stretchable electrode is configured to detect the changes of capacitance in an area that is substantially the same as the area limited by the outer edge of the stretchable electrode. Thus, the effective area $A_{301}$ (FIG. 4b) from which such a stretchable electrode is configured to measure pressure, is equal to the area limited by the outer edge of the stretchable electrode 301; even if the area of the conductive yarns may be less. As an alternative to sewing, an electrode having the shape of a mesh can be printed with conductive ink. As evident, in both types of electrodes, the effective area of the stretchable electrode is equal to the area limited by the outer edge of the stretchable electrode 301

As known to a skilled person, a force (i.e. total force), is the integral of pressure over the surface on which the force acts on. Therefore, in order to be able to measure the force (i.e. total force) in addition to pressure (i.e. local pressure), preferably substantially all the measurement area should be covered with the stretchable electrodes 300. Thus, the aforementioned distance $d_1$ should be small. On the other hand, if the distance $d_1$ is too small, neighbouring electrodes 300 may capacitively couple to each other, which may disturb the measurements.

Figure 3A:
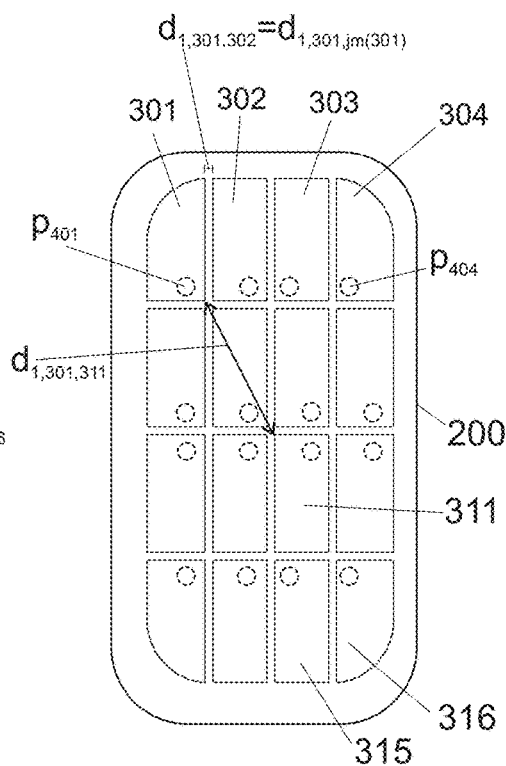
FIG. 3a shows in a bottom view a stretchable layer and stretchable electrodes arranged thereon.
Figure 3B:
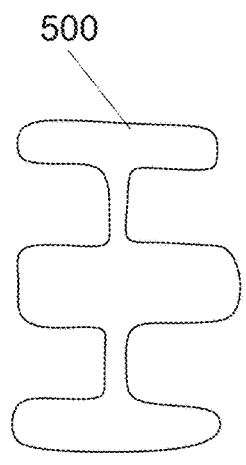
FIG. 3b shows in a top view a flexible foil to be used with the stretchable layer and stretchable electrodes of FIG. 3a, FIG. 3c shows in a top view the flexible foil of FIG. 3b and wiring arranged on the flexible foil.

Referring to FIG. 3a, in an embodiment, each stretchable electrode i (301, 302, 303, . . . , 315, 316) is located a distance $d_{1,i,j}$ apart from each other stretchable electrode j (316, 301, 302, 303, . . . , 315). In FIG. 3a only the distances $d_{1,301,302}$ and $d_{1,301,311}$ are shown. In an embodiment, the minimum of the distances $d_{1,i,j}$ is at least 1 mm, preferably at least 2 mm. Such a minimum distance improves the separation of the stretchable electrodes, resulting in less capacitive coupling between the electrodes. As a result, disturbances resulting therefrom during measurements will be diminished.

An alternative or additional way of characterizing a preferable configuration is that the distance between an electrode 300 and another electrode that is closest to that electrode should be reasonably small. This ensures that most of the stretchable layer 200 is covered by electrodes, which improves the accuracy for measuring force. This can be expressed with the distances $d_{1,i,j}$. Given an electrode i, an electrode jm(i) is selected such that that electrode is closest to the electrode i. That is, for given electrode i, jm(i) is the electrode j resulting in the minimum of the distances $d_{1,i,j}$ for the given electrode i. As an example, in FIG. 3a, the electrode 302 is closest to the electrode 301. Thus, jm(301) equals 302, and $d_{1,301,302}$ equals $d_{1,301,jm(301)}$. In a preferable electrode configuration each two closest electrodes are reasonable close to each other. More specifically, in an embodiment, the maximum of $d_{1,i,jm(i)}$ is at most 15 mm, preferably at most 10 mm, or at most 5 mm. The maximum can be found by considering each electrode i subsequently.

Figure 6A:
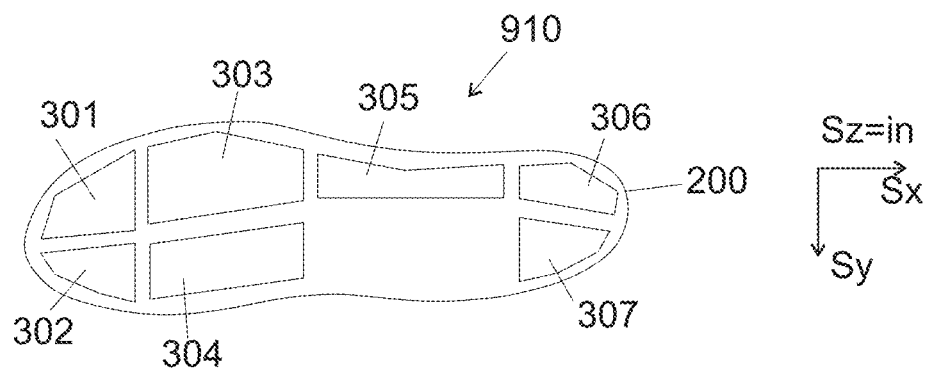
FIG. 6a shows in a bottom view a stretchable layer and stretchable electrodes arranged thereon, the stretchable layer being shaped for an insole.
Figure 6B:
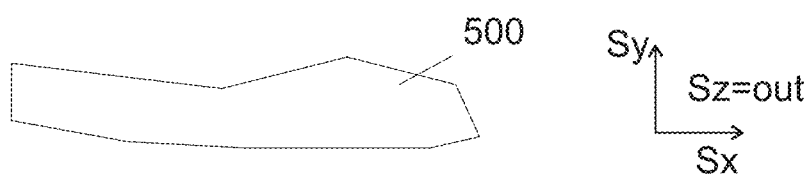
FIG. 6b shows in a top view a flexible foil to be used with the stretchable layer and stretchable electrodes of FIG. 6a, FIG. 6c shows in a bottom view a stretchable layer and stretchable electrodes arranged thereon, the stretchable layer being shaped for an insole.
Figure 6C:
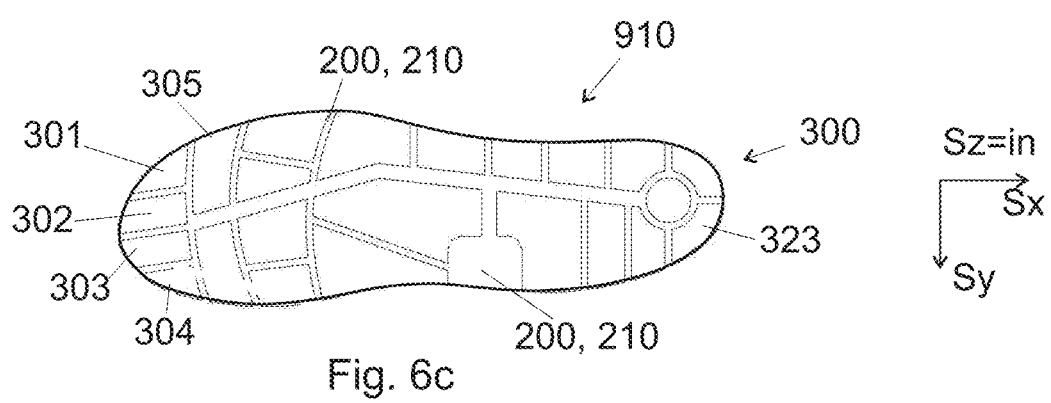
FIG. 6d shows in a top view a flexible foil to be used with the stretchable layer and stretchable electrodes of FIG. 6c, FIGS. 7a-7c show in a top view an elastic deformable layer of a force and/or pressure sensor.

In an embodiment, the force sensor 900 comprises at least fifteen stretchable electrodes 300 attached to the stretchable layer 200 (or the layer 050). Moreover, each one of the stretchable electrodes 300 is arranged some distance $d_{1,i,j}$ apart from all other ones of the stretchable electrodes 300. The number of stretchable electrodes electrically insulated from each other by said distance $d_{1,i,j}$ correlates with the spatial accuracy of the sensor. The more electrodes 300 are used, the better the spatial accuracy. In a preferred embodiment, e.g. in the embodiment of FIG. 6c, the number of stretchable electrodes is at least twenty, such as twenty three.

Regarding the area of the stretchable electrodes 300 and with reference for FIG. 1b, in an embodiment, the total effective cross-sectional area $A_{300}$ of the stretchable electrodes 300 is at least 50%, at least 70%, or at least 80% of the total cross-sectional area $A_{200}$ of the stretchable layer 200. Herein the total effective cross-sectional area $A_{300}$ of the stretchable electrodes 300 refers to the sum of the effective areas of the stretchable electrodes; for example in FIG. 1b, the sum of the effective areas of the first stretchable electrode 301 and the second stretchable electrode 302. As for the effective area, see above. As is evident, the cross-sectional areas are defined on a cross-sectional plane having a surface normal that is parallel to the direction of the thickness of the sensor 900.

Referring to FIG. 1a, in an embodiment, the stretchable layer 200 is arranged in between the first stretchable electrode 301 and the elastic deformable layer 100. In typical application, the sensor is more comfortable to use, provided that the elastic deformable layer 100 is directly in contact with the stretchable layer 200, i.e. the stretchable electrodes 300 are not arranged in between the elastic deformable layer 100 and the stretchable layer 200.

As indicated in FIG. 1e, in an embodiment, an elastic and stretchable layer 050 serves for the purposes of both the stretchable layer 200 and the elastic layer 100. What has been said about the stretchable electrodes 300 relative to the stretchable layer 200 applies also the stretchable electrodes 300 relative to the elastic and stretchable layer 050. Moreover, what has been said about the stretchability of the stretchable layer 200, in particular the first yield strain $\varepsilon_{y,200}$ thereof, applies also the elastic and stretchable layer 050. Furthermore, what has been said about the electrical conductance of the stretchable layer 200 applies also the elastic and stretchable layer 050. Still further, what has been said about the elasticity of the elastic deformable layer 100, in particular the Young's modulus thereof, applies also the elastic and stretchable layer 050. Thus, the Young's modulus $Y_{050}$ of the elastic and stretchable layer 050 may be within the limits discussed above for the layer 100. Still further, what has been said (or will be said) about the thickness $t_{100}$ or the direction of the thickness $t_{100}$ of the elastic deformable layer 100 applies to the thickness $t_{050}$ of the elastic stretchable layer 050 and the direction of the thickness $t_{050}$.

Referring to FIGS. 1a and 1c, the force sensor 900 further comprises a flexible foil 500 having a second Young's modulus $Y_{500}$; and electrically conductive wiring 400 attached to the flexible foil 500. The first Young's modulus $Y_{200}$ (of the stretchable layer 200) is less than the second Young's modulus $Y_{500}$. In this way, the flexible foil 500 resists deformations more than the stretchable layer 200.

As for the differences between the first and the second Young's moduli, the first Young's modulus $Y_{200}$ may be e.g. at least 25%, at least 50%, or at least 75% less than the second Young's modulus $Y_{500}$.

The difference between the Young's moduli has the effect that, in use, the tensile strain in the flexible foil 500 is small, whereby the wiring 400 attached to the flexible foil 500 need not to be stretchable. This has the further effect that the wiring 400 can be made much narrower than if it were stretchable. For example, in an embodiment, the electrically conductive wiring 400 comprises wires (401, 402) that have a width $W_{400}$ of at most 200 μm or at most 150 μm. More preferably, the electrically conductive wiring 400 consist of such wires (401, 402), the at least 50% or at least 60% of the wires (401, 402) have a width $W_{400}$ of at most 200 μm or at most 150 μm. Herein the proportions having the given width are given length-wise. Thus, e.g. provided that the total length of the wires is 1000 mm, e.g. at least 500 mm or the wires may have a width of at most 200 μm.

As known to a skilled person, the flexibility of a foil is inversely proportional to the third power of the thickness of the foil. Thus, the flexible foil should be sufficiently thin in order to ensure its flexibility in use. In an embodiment, the thickness $t_{500}$ of the flexible foil 500 is at most 0.5 mm. The thickness $t_{500}$ of the flexible foil 500 may be e.g. less than 0.4 mm. In an embodiment, the flexible foil comprises at least one of polyester, polyimide, polyethylene naphthalate, and polyetheretherketone.

Figure 6D:
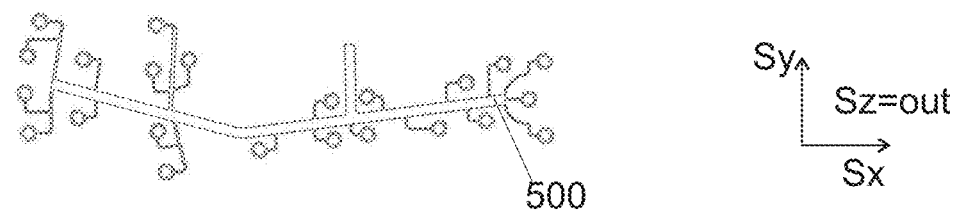

Moreover, to have a comfortable sensor 900, preferably most of the sensor 900 is, or at least feels, stretchable. Conversely, the flexible foil 500, which may be a non-stretchable foil 500 in the aforementioned sense, may be small compared to the stretchable layer 200. Thus, in an embodiment, a cross sectional area of the flexible foil 500 is at most half of a cross sectional area of the stretchable layer 200. Herein the cross sectional areas refer to areas of cross sections on planes having a surface normal that is parallel to the direction of thickness of the sensor 900. In some of these embodiments, the cross sectional area of the flexible foil 500 is at most one third or at most one fourth of the cross sectional area of the stretchable layer 200. Such embodiments are depicted e.g. in FIGS. 1d, 3d, and 6d.

In the force sensor 900, at least a part of the electrically conductive wiring 400 is coupled to the first stretchable electrode 301 in an electrically conductive manner; and at least a part of the electrically conductive wiring 400 is coupled to the second stretchable electrode 302 in an electrically conductive manner. In this way, the sensor 900 comprises connections 490 in between the wiring 400 and the stretchable electrodes 300. The connections are electrically conductive. The connections 490 may be made such that the electrical resistivity of the connection is at most 10Ω. In addition or alternatively, the material of the connection 490 may be electrically conductive in the aforementioned sense.

In an embodiment, a connection 490 is made from electrically conductive adhesive, i.e. comprises cured electrically conductive adhesive. Such adhesives include isotropically conductive adhesives and anisotropically conductive adhesives. The connection 490 may be formed using conductive tape, such as an anisotropically conductive adhesive. Conductive adhesives typically comprise nickel, graphite, or silver particles mixed in a matrix material. The matrix material may be a cured polymer that is formed by polymerization of a resin of the adhesive during curing thereof. The resin may be an epoxy resin. An example of such an adhesive is known by the names LOCTITE ABLESTIK CA 3150 and Hysol ECCOBOND CA3150. Furthermore the connections 490 may be galvanic, whereby a connection may comprise some solder, wherein the solder may comprise tin. Commonly available solders include tin-lead, tin-copper-silver, and tin-zinc-copper solder alloys.

Figure 3C:
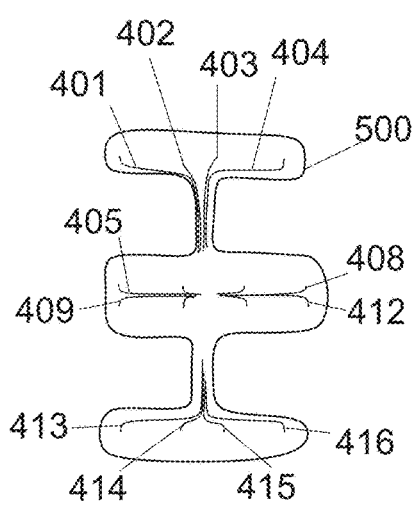
FIG. 3d shows in a top view another flexible foil that can be used with the stretchable layer and stretchable electrodes of FIG. 3a, FIG. 4a shows in a bottom view a stretchable layer and stretchable printed electrodes arranged thereon.
Figure 3D:
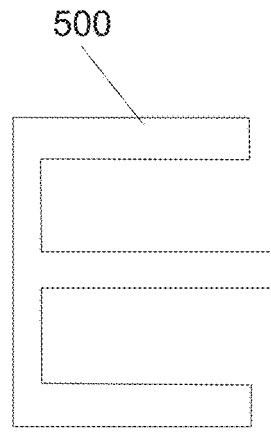
Figure 4C:
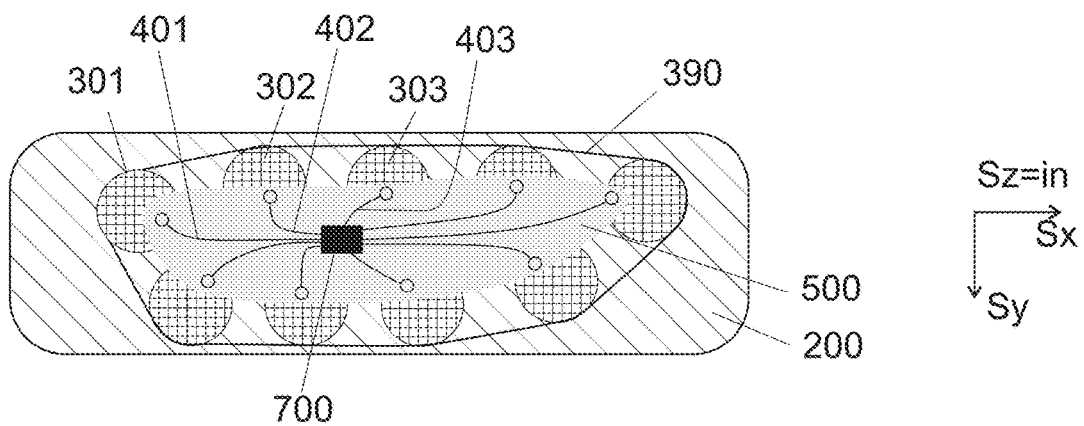

As indicated in FIGS. 3c and 4c, the wiring 400 comprises wires 401, 402, 403, . . . , 416. The wires 401, 402, 403, . . . , 416 are electrically insulated from each other. Moreover, to each stretchable electrode at least one wire is coupled in an electrically conductive manner. For example, in an embodiment, at least a part of the electrically conductive wiring 400, such as the wire 401, is coupled to the first stretchable electrode 301 with an electrically conductive connection 490. In an embodiment, at least a part of the electrically conductive wiring 400, such as the wire 402, is coupled to the second stretchable electrode 302 with an electrically conductive connection 490.

Furthermore, typically, a wire is coupled in an electrically conductive manner to only one stretchable electrode. This is to improve the spatial resolution of the sensor, i.e. each stretchable electrode can be used to measure a force or pressure at the location of substantially only the stretchable electrode.

A wire that is connected to an electrode overlaps the stretchable electrode to which it is connected. Herein the term "overlap" means that the area defined by the boundaries of the stretchable electrode comprises at least a projection of the wire, the projection being projected in the direction of the thickness of the sensor 900 onto the area. Moreover, preferably, each wire overlaps only one electrode. This ensures that a measurement using the first stretchable electrode 301 does not disturb a measurement using the second stretchable electrode 302.

In addition or alternatively, in an embodiment, at least some of the wiring 400 is arranged not to overlap any of the stretchable electrodes 300. For example, in an embodiment, at most 25% of the wiring 400 (the percentage measured length-wise, see above) is arranged to overlap (in the aforementioned meaning) a stretchable electrode 300. Correspondingly, an electrode-free space 210 (see FIG. 1b) is left on the stretchable layer 200 outside of all such stretchable electrodes (300, 301, 302, 303, 304, 305, 306) that are attached to the stretchable layer 200. In an embodiment, at least some of the electrically conductive wiring 400 is arranged to overlap the electrode-free space 210. Thus, the electrode-free space 210 comprises at least some of a projection of the wiring 400, the projection being projected in the direction of the thickness of the sensor 900 onto the electrode-free space 210. In other words, at least some of the electrically conductive wiring 400 is arranged on or below the electrode-free space 210. As indicated above, in an embodiment, at least 75% of the electrically conductive wiring 400 is arranged to overlap the electrode-free space 210. Also this diminishes the disturbances that a measurement using the first stretchable electrode 301 has on a measurement using the second stretchable electrode 302.

Moreover, in an embodiment, at least some of the wiring 400 is arranged at a central area of the sensor 900. Preferably, most of the of the wiring 400 is arranged at a central area of the sensor 900. This has two effects. First, it has been found that in a typical use, the boundaries of the sensor are exposed to highest mechanical strains, in particular strains in a direction other than the thickness. Correspondingly such strains are lower at the centre. Since the flexible foil 500 is practically not stretchable, applying the foil 500 and the wiring to a central area improves the mechanical reliability of the sensor 900. Second, in this way, the sensor 900 can be cut to shape. In particular, the boundaries of the sensor 900 can be cut without affecting the functionality of the sensor 900. In this way, similar sensors 900 can be produced, and they may be cut to shape according to need. For example, a one-size, i.e. large, insole can be produced, and the insole can be cut to fit footwear of the user. Thus, in an embodiment, at least 90% of the electrically conductive wiring 400 is arranged a second distance $d_2$ (See FIG. 1d) apart from a boundary of the stretchable layer 200. In an embodiment, the second distance $d_2$ is at least 5% of the smaller of a length $L_{200}$ and a width $W_{200}$ of the stretchable layer 200. In an embodiment, the second distance $d_2$ is at least 5 mm. In an embodiment, at least 95% of the electrically conductive wiring 400 is arranged the second distance $d_2$ apart from a boundary of the stretchable layer 200.

An alternative way of describing the preferable arrangement of the wiring is to consider the configuration of the stretchable electrodes 300. Referring to FIGS. 4a and 4b, all the stretchable electrodes 300 are arranged within a convex area of a plane having a surface normal that is parallel to the direction of the thickness of the sensor 900. The smallest of such convex areas that include all the stretchable electrodes 300 is denoted by the reference 390 in FIGS. 4a and 4b. In the figures, only the boundary of such an area is shown. As conventional, the term "convex area" refers to such a part of a plane that a section connecting any two points of that part of the plane is entirely contained within that part of the plane. In some embodiments, such a smallest convex area is comprised by the stretchable layer 200. However, in case the shape of the stretchable layer 200 is not convex, it is possible that the smallest convex area is not comprised by the stretchable layer 200. This is the case e.g. in FIG. 6c. In an embodiment, at least 90% or at least 95% of the wiring 400 overlaps the smallest convex area 390 that includes all the stretchable electrodes 300.

In FIG. 1b, the location to which the wire 401 is attached is denoted by $p_{401}$. Such location may be referred to as a contact position. In a corresponding manner, the location to which the wire 402 is attached is denoted by $p_{402}$. The wiring 400 may comprise pads that are arranged to be connected to the contact positions $p_{401}$, $p_{402}$. Similar locations are shown also in FIGS. 2 and 3a. The locations of the contact positions $p_{401}$, $p_{402}$, . . . are optimized so that the length of the wiring 400 will be minimized. In this way, the resistance of the wiring is 400 also small. As indicated in FIG. 1d, the wire 401 is attached to the contact position $p_{401}$ and the wire 402 is attached to the contact position $p_{402}$.

In the force sensor 900, the stretchable layer 200, the first and second stretchable electrodes 301, 302, the flexible foil 500, and the electrically conductive wiring 400 are left on a same side of the elastic deformable layer 100. This helps the manufacturability of the force sensor.

Figure 2:
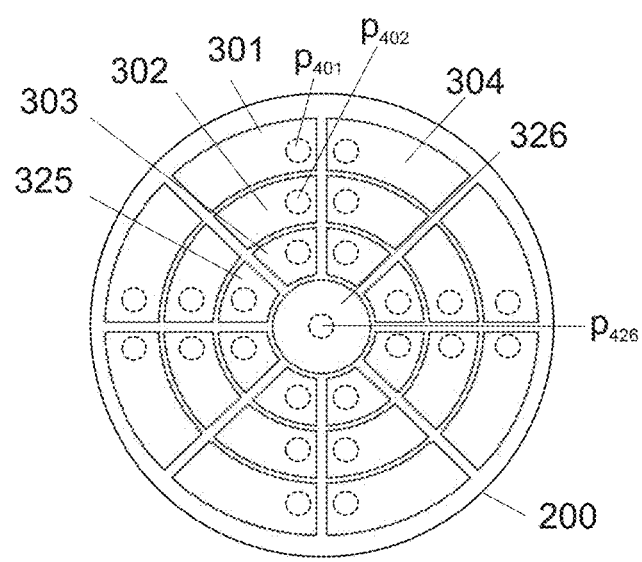
FIG. 2 shows in a bottom view a stretchable layer and stretchable electrodes arranged thereon.

Referring to FIGS. 1c, 1d, and 4c, an embodiment of the force sensor 900 comprises at least one integrated circuit 700 attached to the electrically conductive wiring 400 in an electrically conductive manner. As for FIGS. 1d and 4c, it is noted that the wiring 400 and the circuit 700 are left beneath the flexible foil 500 in these figures. However, the wiring 400 and the circuit 700 are shown in the figures for clarity. In FIGS. 1b and 1c the view (a top view or a bottom view) is selected so that the conductive matter (400, 300) is on top of the corresponding substrate (500, 200, respectively).

In addition, an embodiment of the force sensor 900 comprises a battery configured to supply power to the integrated circuit 700. Preferably, the battery is rechargeable. The integrated circuit 700 is configured to measure the capacitance of at least one of the stretchable electrodes 300. Preferably, the integrated circuit 700 is configured to measure the capacitance of each one of the stretchable electrodes 300 separately. In an embodiment, the integrated circuit 700 is configured to send the measurement results to an external control unit. In an embodiment, the integrated circuit 700 is configured to send the measurement results to an external control unit wirelessly. This allows for analysing the measurement data in real time. In an embodiment, the integrated circuit 700 is configured to store the measurement results to a memory of the force sensor 900, such as a memory of the integrated circuit 700. This allows for analysing the measurement data at least after measurements.

In an embodiment, the integrated circuit 700 is configured to receive data from another force sensor. Moreover, in an embodiment, the integrated circuit 700 is configured to send (i.e. transceive) such data to another external control unit. In this way, multiple force sensors can send measurement data via other sensors to the external control unit.

With the sensor structure as discussed above, it is possible to measure a capacitance of a stretchable electrode 300 relative to something. The capacitance can be measured relative to another stretchable electrode 300. E.g. all other stretchable electrodes 300 may form a common ground, relative to which the capacitance may be measured. Thus, subsequently, the capacitance of all the stretchable electrodes 300 can be measured. This, however decreases the sampling rate. It is also possible to measure capacitance relative to surroundings. This, however, does not give accurate results.

Therefore, with reference to FIG. 5a, a preferable embodiment of the sensor 900 comprises a first electrically conductive layer 600 (or 600a). The elastic and stretchable layer 050 is arranged in between the electrodes 300 and the first electrically conductive layer 600. When the elastic and stretchable layer 050 comprises the elastic deformable layer 100 and the stretchable layer 200, the elastic deformable layer 100 is arranged in between the first electrically conductive layer 600 and the stretchable layer 200. In this way, the first electrically conductive layer 600 may serve as a ground electrode, relative to which the capacitance of each of the stretchable electrodes 300 is measured. In such a configuration, the compression of the elastic deformable layer 100 affects the distance between two electrodes (i.e. the first electrically conductive layer 600, and a stretchable electrode 300, such as the first stretchable electrode 301). As known to a skilled person, the capacitance of such a capacitor formed by said two electrodes is inversely proportional to the distance between the electrodes. By measuring the capacitance, the distance between the electrodes can be calculated. From the distance, the strain within the elastic deformable layer 100 can be determined. Since the material of the layer 100 is known, the strain defines the stress (i.e. pressure) within the deformable layer 100. In this way, pressure at each stretchable electrode can be determined. Moreover since the effective area of the stretchable electrode is known, the force affecting at that stretchable electrode can be determined. Finally, provided that the electrodes cover substantially the whole cross sectional area of the sensor, the total force can be measured.

As for the material of the first electrically conductive layer 600 (or 600a), the first electrically conductive layer 600 may comprise at least one of
electrically conducting material made from conductive ink,
electrically conductive fabric, and
electrically conductive polymer.

The electrically conductive polymer may be a film made of the polymer. In some embodiments, the first electrically conductive layer 600 comprises electrically conductive particles, such as flakes or nanoparticles, attached to each other in an electrically conductive manner. In some of these embodiments, the electrically conductive particles comprise at least one of carbon, copper, silver, and gold.

It has also been found that humidity (or water) may affect the measurement results. Reasonable commonly wearable sensors are used in such a way that sweat introduces moisture to the sensor 900. In particular, when the moisture come close to the electrodes 300, the moisture may affect the measurements a lot.

Referring to FIG. 5b, in order to prevent problems related to excess moisture, an embodiment of the force sensor 900 comprises an additional elastic deformable layer 100b and a second electrically conductive layer 600b. The additional elastic deformable layer 100b is arranged in between the second electrically conductive layer 600b and the stretchable layer 200. Moreover, at least part of the stretchable layer 200 is arranged in between the elastic deformable layer 100 and the additional elastic deformable layer 100b. Thus, at least part of the stretchable layer 200 is arranged in between the first electrically conductive layer 600a and the second electrically conductive layer 600b. In an embodiment, at least the first stretchable electrode 301 is arranged in between the first electrically conductive layer 600a and the second electrically conductive layer 600b. In an embodiment, all the stretchable electrodes 300 are arranged in between the first electrically conductive layer 600a and the second electrically conductive layer 600b.

What has been said about the material of the first electrically conductive layer (600, 600a) applies to the material of the second electrically conductive layer 600b. What has been said about the material of the elastic deformable layer 100, 100a applies to the additional elastic deformable layer 100b.

A problem related to such sensors is the selection of the material of the elastic deformable layer 100, 100a and/or the additional elastic deformable layer 100b. As indicated above, the Young's modulus of the layer should be reasonably small. However, many material that are soft and/or have a small Young's modulus are known to creep. Creep, on the other hand is not preferred, since the permanent compression of the elastic deformable layer 100, 100a, 100b would affect the measurement results.

Figure 7A:
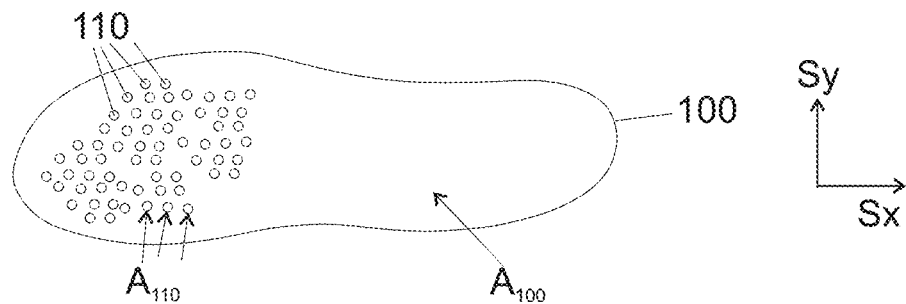
FIGS. 7d-7f show in a side view an elastic deformable layer of a force and/or pressure sensor.
Figure 7B:
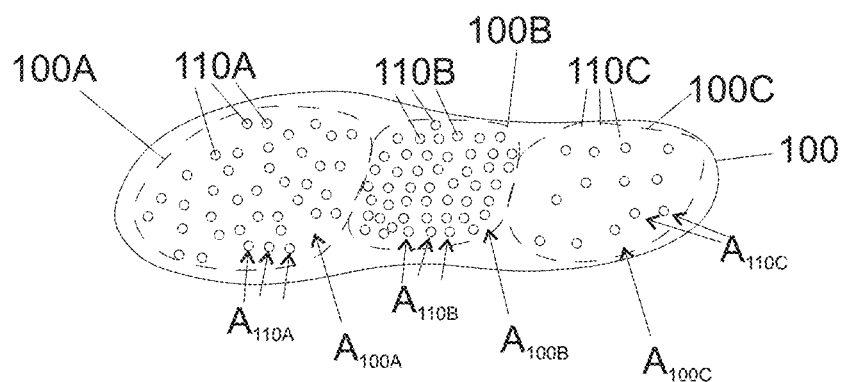
Figure 7C:
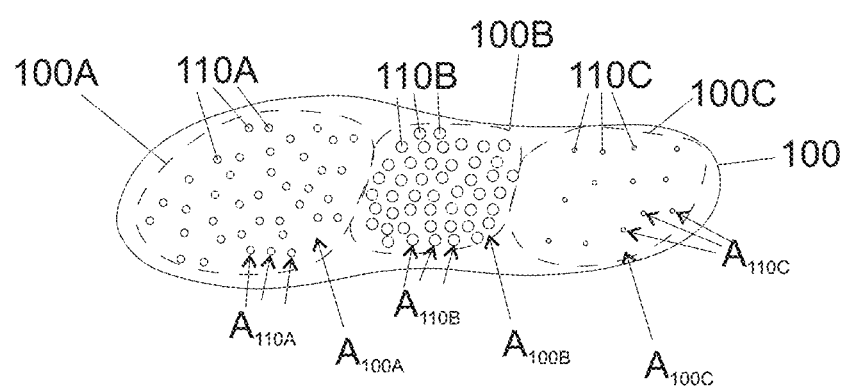

Referring to FIGS. 7a to 7c, in order to address this problem, in an embodiment, the elastic deformable layer 100, 100a limits holes 110 that extend in the direction of the thickness $t_{100}$ of the elastic deformable layer 100. Such holes 110 in effect make the material softer. Thus, by having the holes 110, it is possible to use a harder material and/or a material with a higher Young's modulus. Such a material typically creeps significantly less than softer materials. The effect of the holes 110 is simply to reduce the area of that part of the elastic deformable layer 100 that comprises the deformable solid material. As the area decreases, similar forces generate a higher stress. Even if not explicitly shown, in the alternative or in addition, the additional elastic deformable layer 100b may limit corresponding holes.

Preferably, the total cross-sectional area $A_{110}$ of the holes 110 constitute at least 5% or at least 10% of the cross sectional area $A_{100}$ of the elastic deformable layer 100. Herein the cross section refers to a cross section on a plane that has a surface normal that is parallel to the direction of thickness. Moreover, the total cross-sectional area $A_{110}$ of the holes 110 refers to the sum of the cross-sectional areas of the individual holes 110. Still further, the cross sectional area $A_{100}$ of the elastic deformable layer 100 refers to the area of a section limited by the outer boundary of the elastic deformable layer 100. Thus, the cross sectional area $A_{100}$ of the elastic deformable layer 100 is constituted by the total cross-sectional area $A_{110}$ of the holes 110 and the area of that part of the elastic deformable layer 100 that comprises the deformable solid material of the deformable layer 100. However, it is possible that only a small portion of the elastic deformable layer 100 limits holes, whereby the total cross-sectional area $A_{110}$ of the holes 110 may be small.

In an embodiment, at least some of the holes 110 extend from a first side 102, 102a (see FIGS. 5a and 5b) of the elastic deformable layer 100, 100a, through the elastic deformable layer 100, 100a, to a second side 104, 104a of the elastic deformable layer 100. In addition to softening, such through-holes may improve ventilation of the sensor 900. In case the sensor 900 comprises the additional elastic deformable layer 100b, in an embodiment, at least some holes extend from a first side 102b (see FIG. 5b) of the additional elastic deformable layer 100b, through the additional elastic deformable layer 100b, to a second side 104b of the additional elastic deformable layer 100b.

Referring to FIGS. 7a to 7c, in particular to 7b and 7c, the holes 110 can be used engineer the local effective hardness of the elastic deformable layer 100. By using holes, a region can be made softer than another region, even if the same material is used in both regions. Correspondingly, in areas, where the load (force or pressure) is known to be small, a lot of holes can be made to soften the material a lot. A lot of holes refers to the total cross sectional area of the holes in proportion to the corresponding region of the deformable layer 100. By increasing the size and/or number of the holes, the material can be made softer. FIG. 7b indicates harder and softer regions made by the holes 110, wherein the size of the holes is the same, but their number density varies. FIG. 7b indicates harder and softer regions made by the holes 110, wherein the size of the holes varies as well as their number density. Naturally it would be possible to affect only the size of the holes.

In FIGS. 7b and 7c, the elastic deformable layer 100 comprises a first region 100A and a second region 100B. The second region 100B does not comprise a part of the first region 100A. The first region 100A limits first holes 110A that extend in the direction of the thickness $t_{100}$ of the elastic deformable layer 100. The total cross-sectional area of the first holes $A_{110A}$ constitutes a first portion ($A_{110A}/A_{100A}$) of the cross sectional area AMA of the first region 100A. Moreover, the second region 100B limits second holes 110B that extend in the direction of the thickness $t_{100}$ of the elastic deformable layer 100. The total cross-sectional area of the second holes $A_{110B}$ constitutes a second portion ($A_{110B}/A_{100B}$) of the cross sectional area $A_{100B}$ of the second region 100B. To have the aforementioned effect of softening the material differently at different locations, the first portion ($A_{110A}/A_{100A}$) is different from the second portion ($A_{110B}/A_{100B}$). For example, the difference between the portions ($A_{110A}/A_{100A}$) and ($A_{110B}/A_{100B}$) may be at least 25 percentage units.

Moreover, the stiffness of the layer 100 may be engineered in particular at the location where the stretchable electrodes are arranged. Therefore, in an embodiment, an area encircled by an outer edge of a stretchable electrode 300 comprises at least a part of a projection of a hole 110, wherein the projection of the hole 110 is projected onto the area in the direction of thickness of the sensor 900. In an embodiment, an area encircled by an outer edge of a stretchable electrode 300 comprises a projection of a holes 110. In an embodiment, an area encircled by an outer edge of a stretchable electrode 300 comprises projections of multiple holes 110. In an embodiment, a region 100A, 100B, 100C comprises at least part of a stretchable electrode 300. Moreover preferably, a region 100A, 100B, 100C comprises a stretchable electrode 300.

It is also noted that the engineering of the softness may be more effective when the number of first holes 110A and second holes 110B is significant. For example, the number of first holes 110A in the first region 100A may be at least ten or at least fifty. For example, the number of second holes 114E in the second region 100B may be at least ten or at least fifty. Moreover, the first region 100A or the second region 100B is not arbitrarily large. In an embodiment, the first region 100A is the smallest convex area encircling all the first holes 110A. In an embodiment, the second region 100B is the smallest convex area encircling all the second holes 110B. In an embodiment, the first region 100A and the second region 100B constitute the elastic deformable layer 100.

However, as indicated in FIGS. 7b and 7c, the elastic deformable layer 100 may comprise a third region 100C such that the third region 100C does not comprise a part of the second region 100B or a part of the first region 100A. The third region 100C limits third holes 1100 that extend in the direction of the thickness $t_{100}$ of the elastic deformable layer 100. The total cross-sectional area of the third holes $A_{110C}$ in constitute a first portion ($A_{110C}/A_{100C}$) of the cross sectional area $A_{100C}$ of the third region 100C. Moreover, the third portion ($A_{110C}/A_{100C}$) is different from the first portion ($A_{110C}/A_{100C}$) and the second portion ($A_{110B}/A_{100B}$). In an embodiment, the first region 100A, the second region 100B, and the third region 100C constitute the elastic deformable layer 100.

Figure 7D:
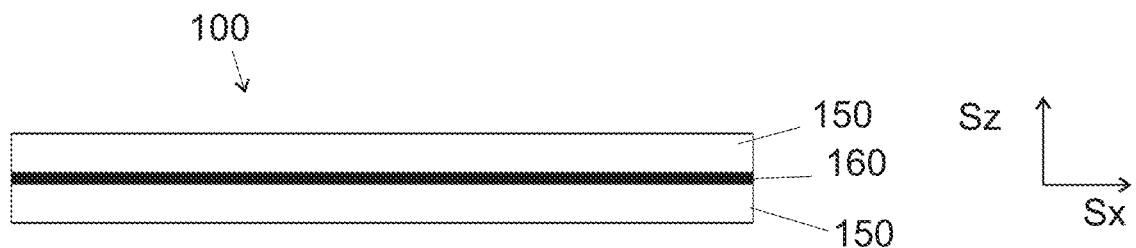
Figure 7E:
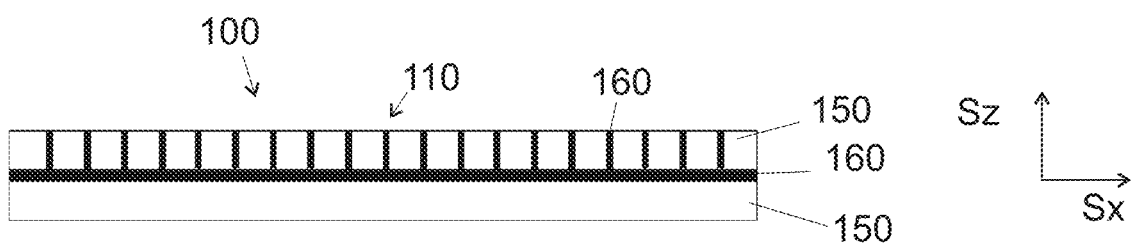
Figure 7F:
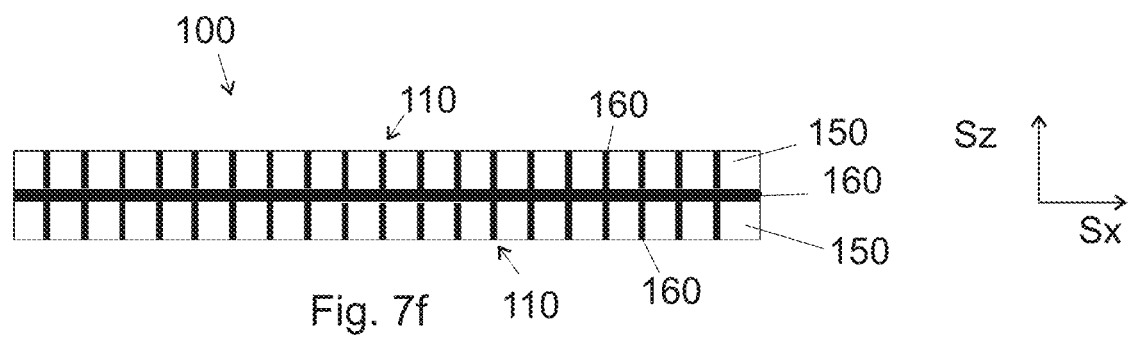

Referring to FIGS. 7d to 7f, in addition or as an alternative to holes 110, the material of the deformable elastic deformable layer 100, 100a can be softened by applying a softer layer of material 160 as part of the elastic deformable layer 100, 100a. The softer layer 160 may be arranged e.g. in between two harder layers 150, as indicated in FIG. 7d. Moreover, the harder material 150 may comprise holes 110 that have been filled with the softer material 160 as indicated in FIGS. 7e and 7f. As indicated above, the holes 110 need not be filled.

Even if not shown in the figures, it is possible to soften, in addition or alternatively, the additional elastic deformable layer 100b in a similar manner.

Moreover, referring to FIG. 1e, in an embodiment, the elastic and stretchable layer 050 consists of a layer of only one material. What has been said about engineering the stiffness of the elastic deformable layer 100 applies as well to the elastic and stretchable layer 050. The holes 110 may extend in the direction of the thickness of the elastic and stretchable layer 050. The holes 110 may extend from one side of the elastic and stretchable layer 050 to the opposite side of the elastic and stretchable layer 050 in the direction of the thickness of the elastic and stretchable layer 050.

Figure 8A:
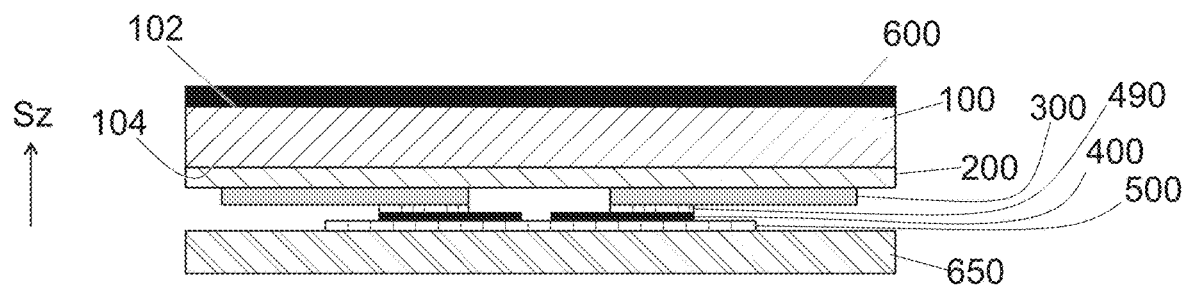
FIGS. 8a-8c show in a side view embodiments of a force or pressure sensor having a thermoplastic support layer.
Figure 8B:
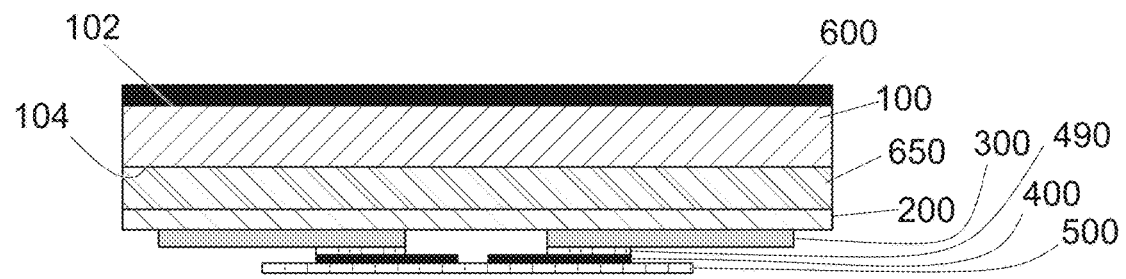

An embodiment of the sensor may be used, in addition to measurements, to support the user. Such supporting may further improve the comfort. Referring to FIGS. 8a-8b an embodiment of the sensor 900 comprises a support layer 650. Such a support is typically comfortable if it has been shaped to comply with a body part of the used. However, the shape of the body part may vary from a user to another user.

In order to shape the support layer 650 according to needs, the support layer 650 comprises thermoplastic material. A thermoplastic material becomes deformable above a deflection temperature and regains its rigidity upon cooling. In this way, the support layer may be heated above the deflection temperature. While being heated, the support layer 650 may be deformed to a shape, e.g. to a shape conforming to a body part of a user, such as to a shape of a foot. Upon cooling, the support layer 650 regains its rigidity and may serve as a support for the user. In this way, the support can be personalized.

The deflection temperature of the thermoplastic material of the support layer 650 should not be too low, in order to have the supporting effect also in use; in particular in use when in contact with a body part. Moreover, the deflection temperature of the thermoplastic material of the support layer 650 should not be too high, because the sensor 900 comprises electrical contacts, which are vulnerable to heat. Preferably the deflection temperature is from 60° C. to 120° C. Moreover, to have a reasonably supportive layer 650, a thickness of the support layer 650 should be at least 0.2 mm, such as from 0.2 mm to 2 mm. The thickness here refers to an average thickness.

In an embodiment, the support layer 650 comprises at least one of polycarbonate, polyvinylchloride, acrylics (e.g. Styrene-acrylonitrile copolymers, acrylonitrile styrene acrylate), polymethyl-methacrylate, polyethylene terephthalate, and glycol-modified polyethylene terephthalate. The support layer 650 may further comprise reinforcing fibres from the group comprising carbon fibres, glass fibres, and aramid fibres.

Figure 8C:
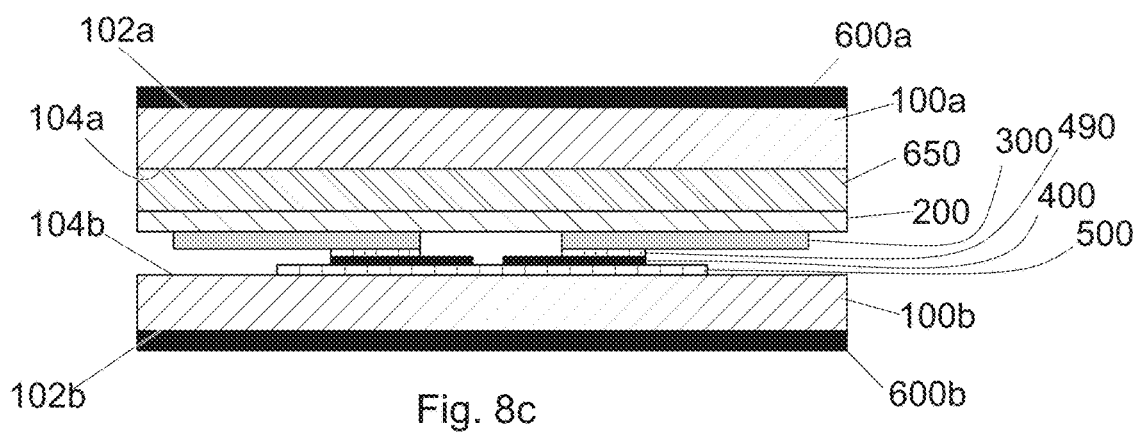

The support layer 650 may be arranged such that, in use, the elastic deformable layers (100, 100a) or the additional elastic deformable layer 100b is arranged to be left in between a point where the force that is sensed affects and the support layer 650. For example, the sensor of FIGS. 8a to 8c is configured to be used such that the force that is sensed affects at a point on top of the first electrically conductive layer 600 or 600*a*. Thus, an elastic layer 100, 100*a* is left in between the support 650 and such a point.

As indicated above, the force sensor 900 may be included in a wearable item, such as a garment. Thus, an embodiment of the invention is a wearable item comprising the force sensor 900 as disclosed above.

Examples of wearable items include:
items worn on foot, such as footwear, an insole, or a sock,
items worn on hand, such as a glove, a mitt, or a mitten; especially sports garments such as boxing glove, golf glove or similar, and
trousers and pants.

In addition; the sensor may be used in smart furniture, such as
vehicle chairs,
chairs, sofas,
bed-sheets, blankets, mattresses, and
rugs, and carpets.

However, because of the stretchable layer 200, the sensor 900 is best suited for applications, wherein the sensor deforms in use.

The sensor is particularly suitable for use in an insole 910 suitable for footwear. In such a case the shape of the insole 910 is adapted to the shape of the footwear. Moreover, the insole 910 comprises a force sensor 900 as discussed above.

The following examples summarize some embodiments:

1. A sensor (900) comprising
   an elastic and stretchable layer (050, 100, 200) comprising a layer (200) or consisting of a layer (050) having a first Young's modulus ($Y_{200}$) and a first yield strain ($\Sigma_{y,200}$),
   at least a first stretchable electrode (301) and a second stretchable electrode (302) attached to the elastic and stretchable layer (050, 100, 200) and arranged a first distance ($d_1$, $d_{1,301,302}$) apart from each other,
   a flexible foil (500) having a second Young's modulus ($Y_{500}$), and
   electrically conductive wiring (400) attached to the flexible foil (500), wherein
   at least a part of the electrically conductive wiring (400) is coupled to the first stretchable electrode (301) in an electrically conductive manner,
   at least a part of the electrically conductive wiring (400) is coupled to the second stretchable electrode (302) in an electrically conductive manner,
   the first yield strain ($\varepsilon_{y,200}$) is at least 10 percent,
   the first Young's modulus ($Y_{200}$) is less than the second Young's modulus ($Y_{500}$),
   the thickness ($t_{500}$) of the flexible foil (500) is at most 0.5 mm, and
   a total effective cross-sectional area ($A_{300}$) of the stretchable electrodes is at least 50% of the total cross-sectional area ($A_{200}$) of the elastic and stretchable layer (050, 100, 200).

2. The sensor (900) of example 1, wherein
   the elastic and stretchable layer (050) comprises
   an elastic deformable layer (100) and
   a stretchable layer (200) in such a way that
   the stretchable layer (200), the first and second stretchable electrodes (301, 302), the flexible foil (500), and the electrically conductive wiring (400) are left on a same side of the elastic deformable layer (100).

3. The sensor (900) of the example 2, wherein
   the stretchable layer (200) is arranged in between the first stretchable electrode (301) and the elastic deformable layer (100).

4. The sensor (900) of the example 2 or 3, wherein
   the elastic deformable layer (100) has a Young's modulus (YIN) that is smaller than the first Young's modulus ($Y_{200}$).

5. The sensor (900) of any of the examples 2 to 4, wherein
   the stretchable layer (200) comprises one of thermoplastic polyurethane (TPU), polyimide, and polyester.

6. The sensor (900) of any of the examples 1 to 5, wherein
   the elastic and stretchable layer (050, 100, 200), such as the elastic and deformable layer (100) thereof, comprises at least one of polyurethane, polyethylene, poly (ethylene-vinyl acetate), polyvinyl chloride, polyborodimethylsiloxane, polystyrene, acrylonitrile-butadiene-styrene, styrene-butadienestyrene, ethylene propylene rubber, neoprene, cork, latex, natural rubber, silicone, and thermoplastic elastomeric gel.

7. The sensor (900) of any of the examples 1 to 6, wherein
   an electrode-free space (210) is left on the elastic and stretchable layer (050, 100, 200) outside of all such stretchable electrodes (300, 301, 302, 303, 304, 305, 306) that are attached to the elastic and stretchable layer (050, 100, 200) and
   at least some of the electrically conductive wiring (400) is arranged on or below the electrode-free space (210);
   preferably,
   at least 75% of the electrically conductive wiring (400) is arranged on or below the electrode-free space (210).

8. The sensor (900) of any of the examples 1 to 7, wherein
   the electrically conductive wiring (400) comprises wires (401, 402) that have a width ($W_{400}$) of at most 200 µm;
   preferably
   the electrically conductive wiring (400) consist of wires (401, 402), of which at least 50% have a width ($W_{400}$) of at most 200 µm;

9. The sensor (900) of any of the examples 1 to 8, wherein
   the first stretchable electrode (301) comprises electrically conductive particles, such as flakes or nanoparticles, attached to each other in an electrically conductive manner;
   preferably
   the electrically conductive particles comprise at least one of carbon, copper, silver, and gold.

10. The sensor (900) of any of the examples 1 to 9, wherein
    a flexible foil (500) comprises at least one of polyester, polyimide, polyethylene naphthalate, and polyetheretherketone.

11. The sensor (900) of any of the examples 1 to 10, wherein
    the total effective cross-sectional area ($A_{300}$) of the stretchable electrodes is at least 50% of the total cross-sectional area ($A_{200}$) of the stretchable layer (200).

12. The sensor (900) of any of the examples 1 to 11, comprising
    at least one integrated circuit (700) attached to the electrically conductive wiring (400) in an electrically conductive manner, wherein
    the integrated circuit (700) is configured to measure the capacitance of at least the first stretchable electrode (301).

13. The sensor (900) of any of the examples 1 to 12, wherein
    at least 90% of the electrically conductive wiring (400) is arranged on top or below the smallest convex area (390) that includes all the stretchable electrodes (300).

14. The sensor (900) of any of the examples 1 to 13, wherein
at least 90% of the electrically conductive wiring (400) is arranged a second distance ($d_2$) apart from a boundary of the elastic and stretchable layer (050, 100, 200), wherein
the second distance ($d_2$) is at least 5% of the smaller of a length ($L_{200}$) and a width ($W_{200}$) of the elastic and stretchable layer (050, 100, 200).
15. The sensor (900) of any of the examples 1 to 14, comprising
multiple stretchable electrodes (300) attached to the elastic and stretchable layer (050, 100, 200) such that
each one of the stretchable electrodes (300) is arranged some distance ($d_{1,i,j}$) apart from all other ones of the stretchable electrodes (300);
preferably
the minimum of the distances ($d_{1,i,j}$) is at least 1 mm.
16. The sensor (900) of any of the examples 1 to 15, comprising
connections (490) electrically connecting the stretchable electrodes (300) to the wiring (400), wherein
at least one of the connections (490) comprise electrically conductive adhesive or solder.
17. The sensor (900) of any of the examples 1 to 16, wherein
the elastic and stretchable layer (050, 100, 200) limits holes (110) that extend in the direction of the thickness ($t_{050}, t_{100}$) of the elastic and stretchable layer (050, 100, 200);
preferably
the total cross-sectional area ($A_{110}$) of the holes (110) constitute at least 5% of the cross sectional area ($A_{100}$) of the elastic and stretchable layer (050, 100, 200) and/or
at least some of the holes (110) extend from a first side of the elastic and stretchable layer (050, 100, 200), through the elastic and stretchable layer (050, 100, 200), to a second side of the elastic and stretchable layer (050, 100, 200) and/or
the elastic and stretchable layer (050, 100, 200) comprises an elastic deformable layer (100) and
at least some of the holes (110) extend from a first side (102) of the elastic deformable layer (100), through the elastic deformable layer (100), to a second side (104) of the elastic deformable layer (100).
18. The sensor (900) of the example 17, wherein
the elastic and stretchable layer (050, 100, 200) comprises a first region (100A) and a second region (100B) that does not comprise a part of the first region (100A),
the first region (100A) limits first holes (110A) that extend in the direction of the thickness ($t_{050}, t_{100}$) of the elastic deformable layer (100) such that the total cross-sectional area of the first holes ($A_{110A}$) constitutes a first portion ($A_{110A}/A_{100A}$) of the cross sectional area ($A_{100A}$) of the first region (100A), and
the second region (100B) limits second holes (110B) that extend in the direction of the thickness ($t_{050}, t_{100}$) of the elastic deformable layer (100) such that the total cross-sectional area of the second holes ($A_{110B}$) constitutes a second portion ($A_{110B}/A_{100B}$) of the cross sectional area ($A_{100B}$) of the second region (100B), wherein
the first portion ($A_{110A}/A_{100A}$) is different from the second portion ($A_{110B}/A_{100B}$).
19. The sensor (900) of the examples 1 to 18, comprising
an additional elastic deformable layer (100b) such that
the first stretchable electrode (301) and the second stretchable electrode (302) are arranged in between the elastic and stretchable layer (050, 100, 200) and the additional elastic deformable layer (100b).
20. The sensor (900) of the example 19, wherein
the elastic and stretchable layer (050) comprises
an elastic deformable layer (100) and
a stretchable layer (200) in such a way that
the first stretchable electrode (301) and the second stretchable electrode (302) are arranged in between the elastic deformable layer (100) and the additional elastic deformable layer (100b).
21. The sensor (900) of any of the examples 1 to 20 comprising
a first electrically conductive layer (600, 600a) such that
the elastic and stretchable layer (100) is arranged in a direction of thickness of the sensor (900) in between the first electrically conductive layer (600, 600a) and the first stretchable electrode (301).
22. The sensor (900) of the example 21 comprising
an additional elastic deformable layer (100b) and
a second electrically conductive layer (600b) such that
the first electrically conductive layer (600, 600a) and the second electrically conductive layer (600b) are left on opposite sides of the first stretchable electrode (301), and
the additional elastic deformable layer (100b) is arranged in a direction of thickness of the sensor (900) in between the second electrically conductive layer (600b) and first stretchable electrode (301).
23. The sensor (900) of example 21 or 22, wherein
at least a part of the first and/or the second electrically conductive layer (600, 600a, 600b) is made from a conductive ink and/or
the first and/or the second electrically conductive layer (600, 600a, 600b) comprises electrically conductive fabric and/or
the first and/or the second electrically conductive layer (600, 600a, 600b) comprises electrically conductive polymer.
24. The sensor (900) of the examples 1 to 23, comprising
a support layer (650) such that
the first stretchable electrode (301) and the second stretchable electrode (302) are arranged in between the elastic and stretchable layer (050, 100, 200) and the support layer (650).
25. The sensor of any of the examples 1 to 24, comprising
a support layer (650) comprising thermoplastic material that has a deflection temperature from 60° C. to 120° C., wherein
the support layer (650) has a thickness of at least 0.2 mm.
26. The sensor of example 25, wherein
the support layer (650) is arranged such that, in use, at least one of
the elastic and stretchable layer (050),
the elastic deformable layer (100, 100a), and
additional elastic deformable layer (100b)
is arranged to be left in between [i] a point where a force, which can be sensed, affects and [ii] the support layer (650).
27. The sensor of example 25 or 26, wherein
the support layer (650) comprises at least one of polycarbonate, polyvinylchloride, acrylics (e.g. styrene-acrylonitrile copolymers, acrylonitrile styrene acrylate), polymethyl-methacrylate, polyethylene terephthalate, and glycol-modified polyethylene terephthalate;
optionally
the support layer (650) further comprises reinforcing fibres from the group comprising carbon fibres, glass fibres, and aramid fibres.

28. The sensor of any of the examples 1 to 27, wherein
a cross sectional area of the flexible foil (500) is at most half of a cross sectional area of the elastic and stretchable layer (050, 100, 200).
29. The sensor of any of the examples 1 to 28, wherein
each stretchable electrode (300, i) is located a distance ($d_{1,i,jm(i)}$) apart from a stretchable electrode (300, jm(i)) that is closest to the aforementioned stretchable electrode (300, i), whereby
the configuration of the stretchable electrodes (300, i) defines for each stretchable electrode (300, i) a minimum distance ($d_{1,i,jm(i)}$) from other stretchable electrodes (300), at least some of which minimum distances may be equal, and
a maximum of the minimum distances ($d_{1,i,jm(i)}$) is at most 15 mm, such as at most 10 mm or at most 5 mm.
30. A wearable item, such as a garment, comprising a sensor (900) of any of the examples 1 to 29.
31. The wearable item of example 30, the item being one of
a shoe, an insole, or a sock, or
a glove or a mitt, such as a boxing glove.
32. An insole (910) suitable for footwear, wherein
the shape of the insole (910) is adapted to the shape of the footwear and
the insole (910) comprises a sensor (900) of any of the examples 1 to 29.

The invention claimed is:

1. A capacitive force and/or pressure sensor comprising:
an elastic and stretchable layer comprising or consisting of a layer having a first Young's modulus and a first yield strain,
at least a first stretchable electrode and a second stretchable electrode attached to the elastic and stretchable layer and arranged a first distance apart from each other,
a flexible foil having a second Young's modulus,
an electrically conductive wiring attached to the flexible foil, and
a first electrically conductive layer, wherein
at least a part of the electrically conductive wiring is coupled to the first stretchable electrode in an electrically conductive manner,
at least a part of the electrically conductive wiring is coupled to the second stretchable electrode in an electrically conductive manner,
the elastic and stretchable layer is arranged in a direction of thickness of the sensor in between the first electrically conductive layer and the first stretchable electrode,
the first yield strain is at least 10%,
the first Young's modulus is less than the second Young's modulus,
the elastic and stretchable layer is deformable; and
the sensor comprises
an additional elastic deformable layer and
a second electrically conductive layer, such that
the first electrically conductive layer and the second electrically conductive layer are left on opposite sides of the first stretchable electrode, and
the additional elastic deformable layer is arranged in a direction of thickness of the sensor in between the second electrically conductive layer and the first stretchable electrode.
2. The sensor of claim 1, wherein
the elastic and stretchable layer comprises an elastic deformable layer and a stretchable layer in such a way that the stretchable layer, the first and second stretchable electrodes, the flexible foil, and the electrically conductive wiring are left on a same side of the elastic deformable layer.
3. The sensor of claim 2, wherein the stretchable layer is arranged in between the first stretchable electrode and the elastic deformable layer.
4. The sensor of claim 2, wherein the stretchable layer has the first Young's modulus and the first yield strain and the elastic deformable layer has a Young's modulus that is smaller than the first Young's modulus.
5. The sensor of claim 2, wherein the stretchable layer comprises one of thermoplastic polyurethane (TPU), polyimide, and polyester.
6. The sensor of claim 1, wherein the elastic and stretchable layer comprises at least one of polyurethane, polyethylene, polyethylene-vinyl acetate), polyvinyl chloride, polyborodimethylsiloxane, polystyrene, acrylonitrile-butadienestyrene, styrene-butadienestyrene, ethylene propylene rubber, neoprene, cork, latex, natural rubber, silicone, and thermoplastic elastomeric gel.
7. The sensor of claim 1, wherein an electrode-free space is left on the elastic and stretchable layer outside of all such stretchable electrodes that are attached to the elastic and stretchable layer, and at least some of the electrically conductive wiring is arranged on or below the electrode-free space.
8. The sensor of claim 1, wherein the electrically conductive wiring comprises wires that have a width of at most 200 μm.
9. The sensor of claim 1, wherein the first stretchable electrode comprises electrically conductive particles, such as flakes or nanoparticles, attached to each other in an electrically conductive manner.
10. The sensor of claim 1, further comprising:
at least one integrated circuit attached to the electrically conductive wiring in an electrically conductive manner, wherein
the integrated circuit is configured to measure the capacitance of at least the first stretchable electrode.
11. The sensor of claim 1, wherein least 90% of the electrically conductive wiring is arranged on top or below the smallest convex area that includes all the stretchable electrodes.
12. The sensor of claim 1, wherein
at least 90% of the electrically conductive wiring is arranged a second distance apart from a boundary of the elastic and stretchable layer, wherein
the second distance is at least 5% of the smaller of a length and a width of the elastic and stretchable layer.
13. The sensor of claim 1, further comprising:
multiple stretchable electrodes attached to the elastic and stretchable layer, such that
each one of the stretchable electrodes is arranged some distance apart from all other ones of the stretchable electrodes.
14. The sensor of claim 1, further comprising:
connections electrically connecting the stretchable electrodes to the wiring, wherein
at least one of the connections comprises electrically conductive adhesive or solder.
15. The sensor of claim 1, wherein
the elastic and stretchable layer limits holes that extend in the direction of the thickness of the elastic and stretchable layer.

16. The sensor of claim 15, wherein
the elastic and stretchable layer comprises a first region and a second region that does not comprise a part of the first region,
the first region limits first holes that extend in the direction of the thickness of the elastic deformable layer, such that the total cross-sectional area of the first holes constitutes a first portion of the cross sectional area of the first region, and
the second region limits second holes that extend in the direction of the thickness of the elastic deformable layer, such that the total cross-sectional area of the second holes constitutes a second portion of the cross sectional area of the second region, wherein
the first portion is different from the second portion.

17. The sensor of claim 1, wherein
at least a part of the first and/or the second electrically conductive layer is made from a conductive ink and/or the first and/or the second electrically conductive layer comprises electrically conductive fabric and/or
the first and/or the second electrically conductive layer comprises electrically conductive polymer.

18. The sensor of claim 1, further comprising:
a support layer, such that
the first stretchable electrode and the second stretchable electrode are arranged in between the elastic and stretchable layer and the support layer.

19. The sensor of claim 1, wherein the thickness of the flexible foil s at most 0.5 mm.

20. The sensor of claim 19, wherein
a total effective cross-sectional area of the stretchable electrodes is at least 50% of the total cross-sectional area of the stretchable layer.

* * * * *